US011240138B2

(12) United States Patent
Fontaine et al.

(10) Patent No.: US 11,240,138 B2
(45) Date of Patent: Feb. 1, 2022

(54) MANAGEMENT OF NETWORK CONNECTIONS

(71) Applicant: Orange, Issy-les-Moulineaux (FR)

(72) Inventors: Fabrice Fontaine, Geveze (FR); Han Yan, Puteaux (FR)

(73) Assignee: ORANGE, Issy-les-Moulineaux (FR)

( * ) Notice: Subject to any disclaimer, the term of this patent is extended or adjusted under 35 U.S.C. 154(b) by 168 days.

(21) Appl. No.: 15/026,161

(22) PCT Filed: Sep. 25, 2014

(86) PCT No.: PCT/FR2014/052408
§ 371 (c)(1),
(2) Date: Mar. 30, 2016

(87) PCT Pub. No.: WO2015/044598
PCT Pub. Date: Apr. 2, 2015

(65) Prior Publication Data
US 2016/0241458 A1    Aug. 18, 2016

(30) Foreign Application Priority Data

Sep. 30, 2013  (FR) ...................................... 1359446

(51) Int. Cl.
*H04W 52/42* (2009.01)
*H04L 12/751* (2013.01)
*H04L 12/40* (2006.01)

(52) U.S. Cl.
CPC ........ *H04L 45/02* (2013.01); *H04L 12/40039* (2013.01); *H04L 12/40169* (2013.01); *H04W 52/42* (2013.01)

(58) Field of Classification Search
CPC ...... H04W 84/18; H04W 52/42; H04L 41/12; H04L 45/02; H04L 45/00; H04L 45/04;
(Continued)

(56) References Cited

U.S. PATENT DOCUMENTS 5,159,596 A * 10/1992 Itoh ...................... H04B 7/2643
370/329
5,206,933 A * 4/1993 Farrell ................... H04L 29/06
370/463
(Continued)

FOREIGN PATENT DOCUMENTS

EP        1895713 A1    3/2008

OTHER PUBLICATIONS

International Search Report dated Dec. 10, 2014 for corresponding International Application No. PCT/FR2014/052408, filed Sep. 25, 2014.
(Continued)

*Primary Examiner* — Hassan A Phillips
*Assistant Examiner* — Prenell P Jones
(74) *Attorney, Agent, or Firm* — David D. Brush; Westman, Champlin & Koehler, P.A.

(57) ABSTRACT

A method for managing communication on a network between a first device and a second device. The devices communicate via a first communication link, called a main link, and a second communication link, called a secondary link. The energy consumption of the secondary link is less than that of the first communication link. The method includes establishing validity of a criterion relative to data traffic on at least one of the main or secondary link, and on the basis of the validity of the criterion, managing activation of the at least one link.

11 Claims, 3 Drawing Sheets

(58) Field of Classification Search
CPC ............. H04L 41/04; H04L 12/40169; H04L 12/40039

See application file for complete search history.

(56) References Cited

U.S. PATENT DOCUMENTS

| | | | | |
|---|---|---|---|---|
| 5,218,680 | A * | 6/1993 | Farrell | H04L 29/06 370/433 |
| 5,317,562 | A * | 5/1994 | Nardin | H04L 45/10 370/428 |
| 5,331,634 | A * | 7/1994 | Fischer | H04L 12/4604 370/405 |
| 5,594,943 | A * | 1/1997 | Balachandran | H04W 36/30 455/436 |
| 6,724,726 | B1 * | 4/2004 | Coudreuse | H04Q 11/0478 370/229 |
| 6,865,609 | B1 * | 3/2005 | Gubbi | H04L 29/06 370/349 |
| 7,002,971 | B1 * | 2/2006 | Enns | H04N 7/17309 370/401 |
| 7,324,552 | B1 * | 1/2008 | Galand | H04L 12/5602 370/468 |
| 7,403,539 | B1 * | 7/2008 | Tang | H04W 24/00 370/445 |
| 7,444,401 | B1 * | 10/2008 | Keyghobad | H04L 12/2818 455/41.2 |
| 7,639,609 | B2 * | 12/2009 | Bolt | H04L 41/0816 370/229 |
| 7,747,255 | B2 * | 6/2010 | Dacosta | H04L 43/0882 455/452.2 |
| 7,784,076 | B2 * | 8/2010 | Demircin | H04N 19/152 725/81 |
| 7,940,691 | B2 * | 5/2011 | Golovinsky | H04L 43/0882 370/252 |
| 8,078,727 | B2 * | 12/2011 | Hanson | H04L 41/0893 709/226 |
| 8,223,767 | B2 * | 7/2012 | Nanda | H04L 45/00 370/390 |
| 8,619,620 | B2 * | 12/2013 | Medvedev | H04L 1/06 370/253 |
| 8,718,797 | B1 * | 5/2014 | Addepalli | H04L 43/0811 700/17 |
| 9,331,907 | B1 * | 5/2016 | Gerstenberger | H04L 43/0882 |
| 9,559,973 | B1 * | 1/2017 | Aithal | H04L 47/29 |
| 9,565,113 | B2 * | 2/2017 | Venkatesh | H04L 47/125 |
| 10,079,938 | B2 * | 9/2018 | Kovalenko | H04L 43/0882 |
| 10,785,156 | B2 * | 9/2020 | Raileanu | H04L 41/0896 |
| 2003/0216971 | A1 * | 11/2003 | Sick | G01D 4/004 705/7.36 |
| 2005/0141565 | A1 * | 6/2005 | Forest | H03M 13/43 370/503 |
| 2005/0163059 | A1 * | 7/2005 | Dacosta | H04L 43/0882 370/252 |
| 2005/0187873 | A1 * | 8/2005 | Labrou | G06Q 20/02 705/40 |
| 2005/0195746 | A1 * | 9/2005 | Golovinsky | H04L 41/0879 370/241 |
| 2005/0226251 | A1 * | 10/2005 | Krzanowski | H04L 47/15 370/395.41 |
| 2006/0229090 | A1 * | 10/2006 | LaDue | H04W 84/04 455/507 |
| 2007/0016688 | A1 * | 1/2007 | Hester | H04L 67/32 709/238 |
| 2007/0047578 | A1 * | 3/2007 | Abe | H04L 45/245 370/468 |
| 2007/0186251 | A1 * | 8/2007 | Horowitz | H04N 21/222 725/63 |
| 2008/0248768 | A1 * | 10/2008 | Doi | H04W 52/0245 455/127.5 |
| 2008/0281599 | A1 * | 11/2008 | Rocca | G06F 16/68 704/270 |
| 2010/0002727 | A1 * | 1/2010 | Svelmoe | H04J 3/1623 370/474 |
| 2010/0067401 | A1 * | 3/2010 | Medvedev | H04L 1/06 370/253 |
| 2010/0080206 | A1 * | 4/2010 | Yamada | H04W 48/14 370/338 |
| 2010/0211678 | A1 * | 8/2010 | McDysan | H04Q 3/0025 709/225 |
| 2010/0220625 | A1 * | 9/2010 | Golovinsky | H04L 43/0882 370/252 |
| 2010/0302979 | A1 | 12/2010 | Reunamaki | |
| 2011/0158113 | A1 * | 6/2011 | Nanda | H04L 47/745 370/252 |
| 2012/0265828 | A1 * | 10/2012 | Slepinin | H04L 63/0428 709/206 |
| 2013/0028602 | A1 * | 1/2013 | Fu | H04L 45/10 398/58 |
| 2013/0094597 | A1 * | 4/2013 | Vijayasankar | H04W 4/80 375/257 |
| 2013/0128753 | A1 | 5/2013 | Gallagher | |
| 2013/0182598 | A1 * | 7/2013 | Medvedev | H04L 1/0002 370/252 |
| 2013/0191463 | A1 * | 7/2013 | Thubert | H04L 61/6059 709/206 |
| 2013/0250179 | A1 * | 9/2013 | Lida | G06F 13/4269 348/705 |
| 2013/0322348 | A1 * | 12/2013 | Julian | H04L 5/003 370/329 |
| 2014/0006831 | A1 * | 1/2014 | Keish | G06F 1/3243 713/324 |
| 2014/0100724 | A1 * | 4/2014 | Ghaly | B61L 3/008 701/20 |
| 2014/0362737 | A1 * | 12/2014 | Beshai | H04L 45/02 370/255 |
| 2014/0369489 | A1 * | 12/2014 | Ermann | H04L 65/1006 379/283 |
| 2015/0351005 | A1 * | 12/2015 | Vijayasankar | H04W 12/06 370/216 |

OTHER PUBLICATIONS

English translation of the International Written Opinion dated Feb. 2, 2016 for corresponding International Application No. PCT/FR2014/052408, filed Sep. 25, 2014.

Mitsugi et al., "Bridging UPnP and ZigBee with CoAP; Protocol and its Performance Evaluation", ACM CoNEXT 2011 IoTSP, Dec. 6, 2011, Tokyo, Japan.

Shelby et al., "Constrained Application Protocol (CoAP)" specification from the IETF group—CoRE Working Group Internet-Draft, Jun. 28, 2013.

"EnergyManagement for UPnP 1.0" specification dated Aug. 30, 2013 from the UPnP forum.

IETF, "draft-mariager-6lowpan-v6over-dect-ule-03": "Transmission of IPv6 Packets over DECT Ultra Low Energy" dated Jul. 15, 2013.

IETF "draft-ietf-6lowpan-btle-12": "Transmission of IPv6 Packets over Bluetooth Low Energy" dated Feb. 12, 2013.

* cited by examiner

MANAGEMENT OF NETWORK CONNECTIONS

CROSS-REFERENCE TO RELATED APPLICATIONS

This Application is a Section 371 National Stage Application of International Application No. PCT/FR2014/052408, filed Sep. 25, 2014, the content of which is incorporated herein by reference in its entirety, and published as WO 2015/044598 on Apr. 2, 2015, not in English.

TECHNICAL FIELD

The invention relates to the field of telecommunications and more particularly to the equipment items of a home telecommunication network.

In a general manner, the invention applies to any terminal equipment item, or more simply equipment item, of such a network, equipped with multiple communication interfaces.

PRIOR ART

A home network is a computer network that connects together, with or without wires, the terminal equipment items of a house (computers, peripherals for printing, storage, etc.) that are capable of communicating with one another. A home network has a router equipment item, also commonly called a home gateway, or more simply gateway, an intermediate element providing for the redirection, or routing, of data packets between the various terminals and networks that are connected to it.

The UPnP (from the English "Universal Plug and Play") standard is aimed at allowing peripherals terminals to connect easily and to communicate in a simple manner within such a network. It constitutes a set of communication protocols that are based on the IP (Internet Protocol, the basic protocol for networks of Internet type) protocol and promulgated by the UPnP standardization forum (UPnP Forum). In order to control the equipment items of the network, UPnP uses control points (CP for short). A control point typically sends the various equipment items of a network what are known as search messages (MSEARCH) so as to get back in return a description of the equipment items corresponding to the request. These search messages are most often sent in point-to-multipoint communication mode, also called multicast, from the control point to the equipment items. A terminal equipment item that is compatible with the UPnP standard responds to these request messages and moreover sends, at a regular rate, presence messages (ALIVE) to show that it is active and connected to the network.

Within the context of energy savings, UPnP defines what is known as the "Energy Management" profile (reference may be made to the "EnergyManagement for UPnP 1.0" specification dated Aug. 30, 2013 from the UPnP forum), which allows equipment items to publish the list of their network interfaces (name, description, physical address, network address, type, etc.) and particularly the status of the interfaces (active, deactivated without automatic wakeup, deactivated with periodic wakeup, etc.) and the wakeup method to be used in order to take them out of a standby state.

A terminal equipment item of a local area network of this kind can have multiple different communication interfaces for conversing with the other terminals of the same local area network.

Usually, the terminal has an interface of Ethernet type allowing conversation by wired means on the network using a communication protocol of IP type and a Wifi interface in order to converse wirelessly on the basis of this same IP protocol. The terminal equipment item may, furthermore, have an interface using a low power wireless radio technology, by means of which it is possible to use a radio channel to exchange messages that are compliant with what is known as a "low energy" standard. Among these "low energy" standards, it is possible to cite, by way of example, the ZigBee protocol (a protocol that allows communication, in local area networks, on a radio link, with reduced consumption), the "DECT Ultra Low Energy" standard (DECT ULE for short, an extension of the DECT wireless communication standard for low energy applications) or the "Bluetooth Low Energy" standard (BLE for short, the aim of which is to provide reduced power in comparison with the standard applications of the Bluetooth standard).

Networks supporting these various standards consume little energy. They will be referred to below by the generic name "low consumption networks", or LoWPAN, the acronym for "Low power Wireless Personal Area Networks".

These networks are today not suited to transmitting messages of multicast type because they are not based on the IP protocol that allows this type of exchange. The announcement and search messages of multicast type mentioned above for the UPnP standard therefore require the IP communication interfaces to be kept permanently active, said interfaces consuming a large amount of energy in order to transmit the announcement and search messages.

The invention provides a solution that does not have the disadvantages of the prior art.

SUMMARY

To that end, according to one functional aspect, the subject of the invention is a method for managing the communication on a network between a first equipment item and a second equipment item, said equipment items being capable of communicating via a first communication link, called the main link, and a second communication link, called the secondary link, the energy consumption of which is lower than that of the first communication link, characterized in that it has the following steps:
computation of the validity of a criterion relating to the data traffic on at least one link;
depending on the validity of the criterion, management of the activation of at least one link.

Thus, by analyzing the data traffic on the main link or on the secondary link, the invention provides the advantage of detecting the need to activate or deactivate one or other of the interfaces. If the criterion is met, that is to say valid, the invention particularly allows deactivation of the main link if it is little used so as to make energy savings.

According to a particular implementation of the invention, a method as described above is characterized in that the criterion relating to the data traffic is a use threshold for the bandwidth.

Thus, computation of the percentage use of the bandwidth on the main link allows easy detection of underuse of this link, which is detrimental to the general electricity consumption. In this case, it may be preferable to deactivate it. On the contrary, overuse of the link clearly indicates its relevance. Equally, a high level of use of the bandwidth of the secondary link may indicate that it would be advantageous to activate the main link in order to relieve this secondary link.

According to a second particular implementation of the invention, which can be implemented as an alternative to or concurrently with the previous implementation, a method as described above is characterized in that the criterion relating to the data traffic is a received message of a given type.

Thus, reception, using the method of the invention, of a certain type of messages presaging a higher speed to come, for example a multimedia data stream, can prompt activation of the main link if it is not activated or, conversely, deactivation thereof in order for the secondary data link to take on the future traffic.

According to a third particular implementation of the invention, which can be implemented as an alternative to or concurrently with the previous implementations, a method as described above is characterized in that the criterion relating to the data traffic is a waiting time for reception of a message.

This embodiment of the invention, by taking account of a certain latency, or of the absence of a response from an equipment item, makes it possible to take account of the need to activate the main interface to receive and transmit messages under good quality of service conditions.

According to a fourth particular implementation of the invention, which can be implemented as an alternative to or concurrently with the previous implementations, a method as described above is characterized in that it has a step of activation of the secondary link of the second equipment item and a step of deactivation of the main link of the second equipment item if the criterion relating to the data traffic is valid.

This embodiment of the invention, by taking account of a criterion relating to the data traffic, for example the evaluation of the bandwidth, allows activation of the secondary interface of the equipment item and, at the same time, or just after, for example, deactivation of the main interface, which consumes energy even when messages are not passing through this interface.

According to the prior art, it is impossible to deactivate the main link, particularly of IP type, because it is indispensable to the broadcast of messages of multicast type. Conversely, the method according to the invention allows this constraint to be overcome by wisely using the secondary link to transmit such messages. It is therefore possible to deactivate the main link (IP) and thus to make energy savings.

According to a fifth particular implementation of the invention, which can be implemented as an alternative to or concurrently with the previous implementations, a method as described above is moreover characterized in that it has a step of activation of the main link of the terminal if the criterion is not valid.

If the criterion is not valid, that is to say if the traffic has exceeded a certain threshold on one of the links, typically the secondary link, for example, it is wise to reestablish the main link if it had previously been deactivated, for example by the method of the invention.

According to a sixth particular implementation of the invention, which can be implemented as an alternative to or concurrently with the previous implementations, a method as described above is moreover characterized in that it has the following steps:
  reception of a message from the second equipment item on the secondary link;
  formatting and retransmission of the message to at least one other equipment item of the network.

This implementation of the invention allows retransmission of a message to the control point within the meaning of the UPnP local network. The message can also be retransmitted in multicast mode to various equipment items of the network.

According to another functional aspect, the invention also concerns a method for communication on a terminal equipment item, said equipment item being capable of communicating via a first communication link, called the main link, and a second communication link, called the secondary link, the energy consumption of which is lower than that of the first communication link, characterized in that it has the following steps:
  formatting of at least one message for the secondary link and
  sending of said message on the secondary link.

According to one hardware aspect, the invention also concerns a device for managing the communication between two equipment items, a first equipment item and a second equipment item, said equipment items being capable of communicating via a first communication link, called the main link, and a second communication link, called the secondary link, the energy consumption of which is lower than that of the first communication link, characterized in that it has:
  a module for establishing the validity of a criterion relating to the data traffic on at least one link;
  a module for managing the activation of at least one link depending on the validity of the criterion.

According to another hardware aspect, the invention also concerns a home gateway having a device of this kind for managing the communication between two equipment items.

According to another hardware aspect, the invention also concerns a device for communication on a terminal equipment item, said equipment item being capable of communicating via a first communication link, called the main link, and a second communication link, called the secondary link, the energy consumption of which is lower than that of the first communication link, characterized in that it has:
  a module for formatting at least one message for the secondary link and
  a module for sending said message on the secondary link.

According to another hardware aspect, the invention also concerns a terminal equipment item having a device of this kind for communication on a terminal equipment item.

According to another hardware aspect, the invention also concerns a computer program capable of being implemented on a home gateway having a device for managing the communication between two equipment items, the program comprising code instructions that, when the program is executed by a processor, performs the steps of the management method defined above.

According to yet another hardware aspect, the invention also concerns a computer program capable of being implemented on a terminal equipment item, the program comprising code instructions that, when the program is executed by a processor, performs the steps of the communication method defined above.

This home gateway, this terminal and these computer programs exhibit similar features and advantages to those described previously with regard to the management and communication methods.

According to yet another hardware aspect, the invention concerns recording media that can be read by a data processor on which are recorded programs comprising program code instructions for the execution of the steps of the methods defined above.

The invention will be better understood on reading the description that follows, which is provided by way of example and written with reference to the appended drawings.

DETAILED DESCRIPTION OF AN EXEMPLARY EMBODIMENT ILLUSTRATING THE INVENTION

Figure 1:
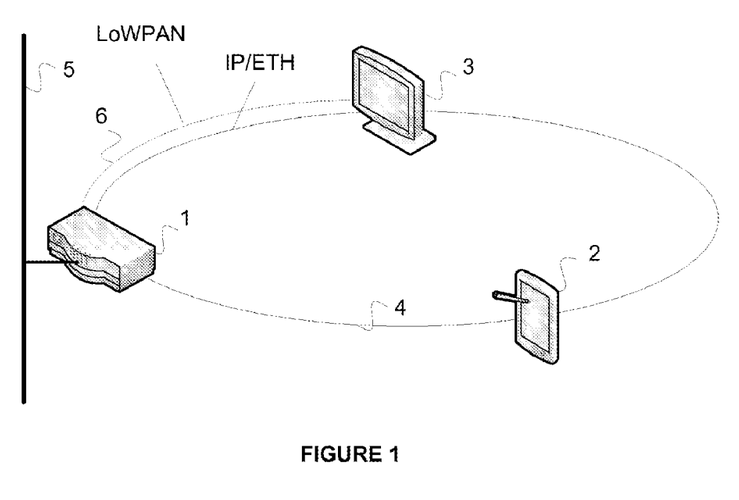
FIG. 1 shows a home network corresponding to the general context of the invention.

FIG. 1 shows a home network corresponding to the general context of the invention.

By way of example, the home network (4) is an IP ("Internet Protocol") local area network. In this example, the local area network supports the functionalities and protocols of the aforementioned UPnP standard.

The home network (4) has a home gateway (1) connected to the Internet network (5) by a high-speed connection. It also has two terminal equipment items (2, 3) in this example, which are capable of establishing communications on the local area network (4).

In the text that follows, terminal equipment item, or more simply terminal, is understood to mean any device capable of connecting to the home network using the UPnP protocol, such as a portable computer, a digital television decoder, a hard disk, etc.

The terminal 3 is a PC, for example, but also plays the part of a media server for the purposes of the UPnP standard: it shares multimedia content with the other equipment items of the network.

During normal operation, the PC (3) sends presence messages (ALIVE) on the local area network in the IP format via a first wired Ethernet interface (IP/ETH), called the main interface, the message packets being based on the IP format, for example IPv4 (version 4 of the IP standard) or, preferably in the context of the invention, IPv6 according to a more recent version of the standard. The IP links, a fortiori of IPv6 type, can consume a large amount of energy. Typically, an IPv6 interface (for example a pair of boxes of Power Line Communication type) to which the equipment item would be connected via its Ethernet cable can consume between 7 and 10 watts. Conversely, a wireless link of WiFi type consumes between 2 and 3 watts, and a ZigBee link consumes, as an example, only 250 mW (milliwatts). It is therefore of particular benefit to use the link of Zigbee type as much as possible, from the perspective of saving energy.

The terminal (3) also has, according to this example, what is known as a secondary interface, in order to communicate on a low consumption network, also called a LoWPAN network in English, that is to say a network typically made up of a set of equipment items that have few (computation, battery, etc.) resources and that are connected through a network that itself has limited speed. This may be a radio link typically of Zigbee, or Bluetooth BLE or DECT ULE, type.

In particular, the 6LoWPAN working group of the IETF has recently defined mechanisms for encapsulating and compressing headers that allow data packets in the IPv6 format to be sent and received using a wireless communication protocol on a LoWPAN network.

Figure 2:
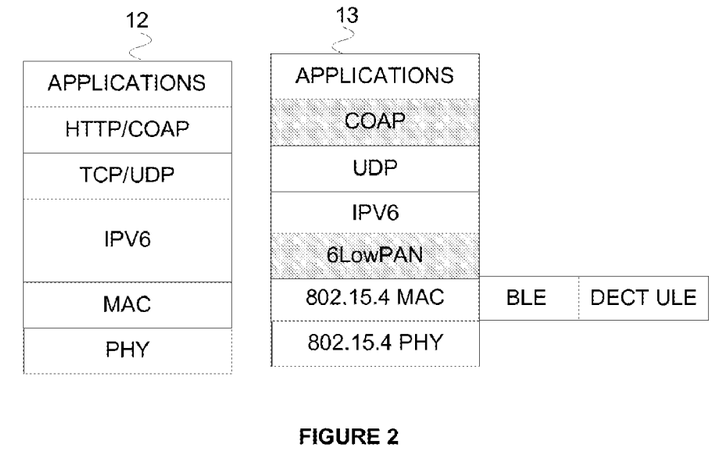
FIG. 2 schematically shows the protocols used on a LoWPAN network and on an IP network.

These encapsulation mechanisms are shown schematically in FIG. 2: the stack of protocols (12) on the left is typically used for transporting data on an IP network (IPv6 in the example). Such a protocol layer will not be described further because it is well known to a person skilled in the art who has ordinary knowledge in the field of telecommunications.

The stack of protocols on the right (13) is conversely suited to a LoWPAN network: between the connection layer (MAC, BLE or DECT ULE) and the network layer (IPv6) there is now a new 6LoWPAN layer, the role of which is to fragment the IPv6 data packets and possibly compress the headers in order to make the new fragments compatible with the lower layers of IEEE 802.15.4 type (physical and connection layers of Zigbee networks). Work is also being done within the IETF to adapt the 6LoWPAN layer with the physical and connection layers of DECT ULE networks (see the document from the IETF—Internet Engineering Task Force—group entitled draft-ietf-6lowpan-btle-12: "Transmission of IPv6 Packets over BLUETOOTH Low Energy" dated Feb. 12, 2013) and to Bluetooth LE (see the document from the IETF group entitled "draft-mariager-6lowpan-v6over-dect-ule-03": "Transmission of IPv6 Packets over DECT Ultra Low Energy" dated Jul. 15, 2013).

In addition to this 6LoWPan layer, the aforementioned low consumption networks often implement the COAP (from the English COnstrained Application Protocol) service protocol (reference will be made to the "Constrained Application Protocol (CoAP)" specification from the IETF group—CoRE Working Group Internet—Draft, Z. Shelby et al.) shown in the figure beneath the application layer and above the UDP transport layer. The COAP protocol defines a set of messages allowing transactions to be performed between a client and a server (in our example, the terminal (3) and the gateway (1)) in a LoWPAN network or on a standard IP network.

For more details, reference will be made by way of example to the following article, which is incorporated here by way of reference: "Bridging UPnP and ZigBee with CoAP; Protocol and its Performance Evaluation; Jin Mitsugi et al.".

In this implementation, a control point within the meaning of UPnP (Control Point—CP) is installed on the terminal 2, for example a tablet computer. The function of the control point is to search for the equipment items of the network and to connect them. By way of example, the control point presents the content of the Media Server of the PC terminal (3) to the user and allows him to play it on the Media Renderer of the same PC (3) according to the following sequence: the control point runs through (BROWSE) the content of the Media Server and asks the Media Renderer to play (PLAY) one of the items of content from the Media Server.

It should be noted that the control point may be situated on another equipment item, for example on the home gateway (1) or on the PC (3). In most cases, the control point is particularly located in the same equipment item as the Media Renderer.

It should also be noted that another equipment item of the local area network, for example that is not shown, could also be equipped with a Zigbee interface.

The principle of the invention is as follows: a smart device, for example installed on the gateway (1), deactivates the IP interface (IPv6 according to the example) of the terminal (2) when conditions so allow, in order to make energy savings, and activates the secondary interface, that is to say the one that allows conversation on the LoWPAN.

From this point onward, the PC (3) needs to transmit the messages showing that it is active (ALIVE) through its secondary interface (for example the ZigBee interface), which continues to be active alone. The device according to the invention takes responsibility for receiving and processing these messages. The device of the invention also has the responsibility of reactivating the main network (IP) when it detects that conditions are no longer appropriate for maintaining communication on the LoWPAN network: a user wishes to be connected to the terminal (3) in order to receive multimedia data, the bandwidth is no longer sufficient (for example if the volume of data is above a certain percentage of the available bandwidth), etc. In this case, it reactivates the main interface of the equipment item and deactivates the secondary interface.

The invention will now be described in more detail with reference to FIGS. 3 and 4.

Figure 3:
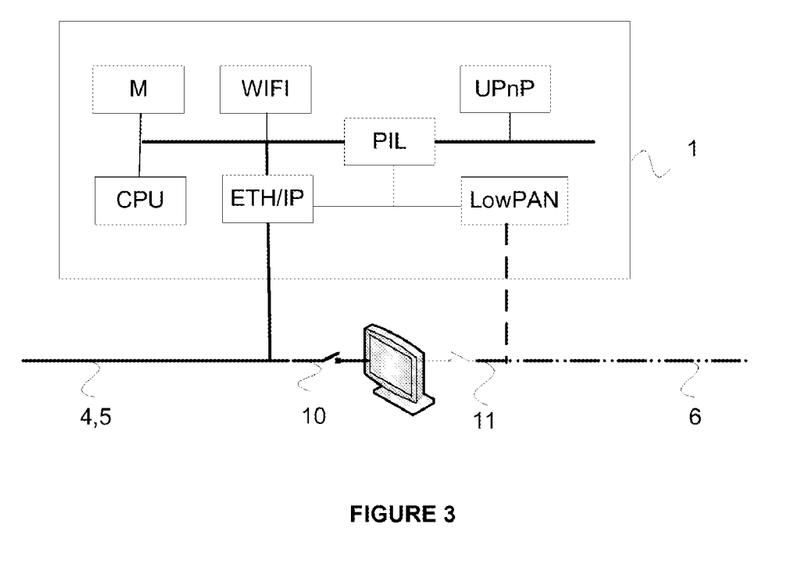
FIG. 3 shows an architecture for a home gateway implementing an embodiment of the invention.

FIG. 3 shows the architecture of an equipment item that implements an embodiment of the invention, such as the gateway (1) in FIG. 1, for example.

Said equipment item typically comprises memories (M) associated with a processor (CPU). The memories may be of ROM (from the English Read Only Memory) or RAM (from the English Random Access Memory) or flash type. Part of the memory M particularly contains, according to the invention, a table describing one or more equipment items of the network and their interfaces. This table is used by the module PIL for controlling the interfaces that are specific to the invention.

An example of a description from such a table is provided below within the context of the UPnP "Energy Management" standard; XML (from the English "eXtended Markup Language") description syntax is used to show the terminal equipment item (3), assuming that it has an active Ethernet interface and an inactive 6LoWPAN interface.

Example of a Description of a Terminal According to the Invention:

```
<?xml version="1.0" encoding="UTF-8"?>
<NetworkInterfaceInfo xsi:schemaLocation="urn:schemas-upnp-
org:lp:emNetworkInterfaceInfo
http://www.upnp.org/schemas/lp/emNetworkInterfaceInfo.xsd"
xmlns="urn:schemas-upnp-org:lp:emNetworkInterfaceInfo"
xmlns:xsi="http://www.w3.org/2001/XMLSchema-instance">
<DeviceInterface>
<DeviceUUID>uuid:00000000-0000-1010-8000-
4424991A912</DeviceUUID>
<FriendlyName>Terminal (3)</FriendlyName>
<NetworkInterface>
    <SystemName>eth0</SystemName>
    <Description>Ethernet 802.3 NIC</Description>
    <MacAddress>54:42:49:91:A9:12</MacAddress>
    <InterfaceType>Ethernet</InterfaceType>
    <NetworkInterfaceMode>IP-up-with-UPnPStandby
    </NetworkInterfaceMode>
    <AssociatedIpAddresses>
       <Ipv6>805b:2d9d:dc28:0:0:fc57:d4c8:1fff</Ipv6>
    </AssociatedIpAddresses>
    <WakeOnPattern>
    FFFFFFFFFFFF54424991A91254424991A91254424991A912-
    5442499[...]
    </WakeOnPattern>
    <WakeSupportedTransport>UDP-Broadcast
    </WakeSupportedTransport>
    <MaxWakeOnDelay>5</MaxWakeOnDelay>
    <DozeDuration>0</DozeDuration>
</NetworkInterface>
<NetworkInterface >
    <SystemName>tun0</SystemName>
    <Description>6LoWPAN over 802.15.4</Description>
    <MacAddress>53:41:48:90:A8:11</MacAddress>
    <InterfaceType>802.15.4</InterfaceType>
    <NetworkInterfaceMode>IP-down-with-UPnPWakeOn
    </NetworkInterfaceMode>
    <AssociatedIpAddresses>
       <Ipv6>805a:2d9c:dc27:0:0:fc56:d4c7:1ffe</Ipv6>
    </AssociatedIpAddresses>
    <WakeOnPattern></WakeOnPattern>
    <WakeSupportedTransport>Other</WakeSupportedTransport>
    <MaxWakeOnDelay>5</MaxWakeOnDelay>
    <DozeDuration>0</DozeDuration>
    </NetworkInterface>
</DeviceInterface>
</NetworkInterfaceInfo>
```

This example file comprises a list for two interfaces (DeviceInterface), each interface typically being described between an opening tag <NetworkInterface> and a closing tag </NetworkInterface>.

The first interface is of IP type. It is active and deactivatable by a new UPnP message of the invention ("IP-up-with-UPnPStandby"). It typically works on an Ethernet 802.3 medium; this allows it to receive wakeup messages of "Wake on Lan" type (<WakeOnPattern>), which, in a known manner, allow a terminal equipment item on standby to be woken remotely.

The second interface is of 6LoWPAN type (<Description>6LoWPAN over 802.15.4C</Description>). It is inactive and activatable by a new UPnP message according to the invention ("IP-down-with-UPnP-WakeOn"). It typically works on an Ethernet 802.3 medium. The method according to the invention wakes up this interface by transmitting an "X_WakeOn" message to the IP interface.

The XML syntax of the file that represents the interfaces of the terminal is generally compliant with the UPnP "Energy Management" standard mentioned previously, except as far as the following two elements are concerned:
   the "InterfaceType" tag allows specification of a low consumption interface, in our example of Zigbee type.
   the "NetworkInterfaceMode" tag allows specification that an interface is deactivatable ("IP-up-with-UPnP-Standby") by a new UPnP message of the invention, "X_Standby", a possible syntax of which is proposed below, or activatable ("IP-down-with-UPnPWakeOn") via the "X_WakeOn" message.

Example of Syntax for the X Standby Message:

```
POST /controlURL URL HTTP/1.1
HOST: 805b:2d9d:dc28:0:0:fc57:d4c8:1fff:52000
CONTENT-LENGTH: bytes in body
CONTENT-TYPE: text/xml; charset="utf-8"
SOAPACTION: "urn:schemas-upnp-
org:service:EnergyManagement:1#X_Standby"
<?xml version="1.0"?>
<s:Envelope       xmlns:s="http://schemas.xmlsoap.org/soap/
envelope/"
s:encodingStyle="http://schemas.xmlsoap.org/soap/
encoding/">
<s:Body>
<u:X_Standby xmlns:u="urn:schemas-upnp-
org:service:EnergyManagement:1">
<NetworkInterfaceSystemName>eth0</NetworkInterfaceSystemName>
```

-continued

```
</u:X_Standby>
</s:Body>
</s:Envelope>
```

Example of Syntax for the X WakeOn Message:

```
POST /controlURL URL HTTP/1.1
HOST: 805b:2d9d:dc28:0:0:fc57:d4c8:1fff:52000
CONTENT-LENGTH: bytes in body
CONTENT-TYPE: text/xml; charset="utf-8"
SOAPACTION: "urn:schemas-upnp-
org:service:EnergyManagement:1#X_WakeOn"
<?xml version="1.0"?>
<s:Envelope          xmlns:s="http://schemas.xmlsoap.org/soap/
envelope/"
s:encodingStyle="http://schemas.xmlsoap.org/soap/encoding/">
<s:Body>
<u:X_WakeOn xmlns:u="urn:schemas-upnp-
org:service:EnergyManagement:1">
<NetworkInterfaceSystemName>tun0</NetworkInterfaceSystemName>
</u:X_WakeOn>
</s:Body>
</s:Envelope>
```

It will be noted that these XML data are only an example of description data and that the invention can also apply to description data that are compliant with another standard.

The gateway 1 communicates with the local area network and the Internet network via the Ethernet/Internet module (denoted ETH/IP in the figure), the WIFI radio module and the Zigbee radio module, denoted LoWPAN in the figure.

The WIFI radio module and the ETH/IP wired module represent what is subsequently called the main interface communicating using the IPv6 protocol. The Zigbee, LoW-PAN interface represents the secondary interface.

The gateway 1 moreover comprises, in accordance with this embodiment of the invention, a module PIL for controlling the interfaces (ETH/IP, WIFI, LoWPAN). By way of example, the module PIL may be a software program that is executed in the memory of the gateway 1, or a hardware and software assembly that is capable of controlling the communication interfaces.

The terminal equipment item (3) of the local area network has equivalent interfaces to ensure communication in accordance with the main interface (IPv6) or the secondary interface (LoWPAN).

The two switches 10 and 11 schematically show a means for activating or deactivating the IP and LoWPan interfaces, respectively, of the PC (3). A command from the module PIL allows the communication channel to be opened or closed by deactivating the corresponding interfaces.

Thus, the messages are transmitted to the terminal (3) via one or other of its interfaces. The messages need to be encapsulated by observing the families of communication protocols on one or other of the links, or in this example the stack (12) with IPv6 for the main interface and the 6LoW-PAN stack (13) for the secondary interface, as previously shown schematically in FIG. 2.

It is conceivable for the control point (CP on the basis of the UPnP terminology) to be situated inside the home gateway (1); the CP then communicates with the terminals (in the example, the terminals 2 and 3) via the local area network (4, 5) by wire (Ethernet) or wirelessly; alternatively, it may also be situated outside the gateway, as shown in FIG. 1.

Equally, the module PIL may, alternatively, be situated on another equipment item of the local area network.

Figure 4:
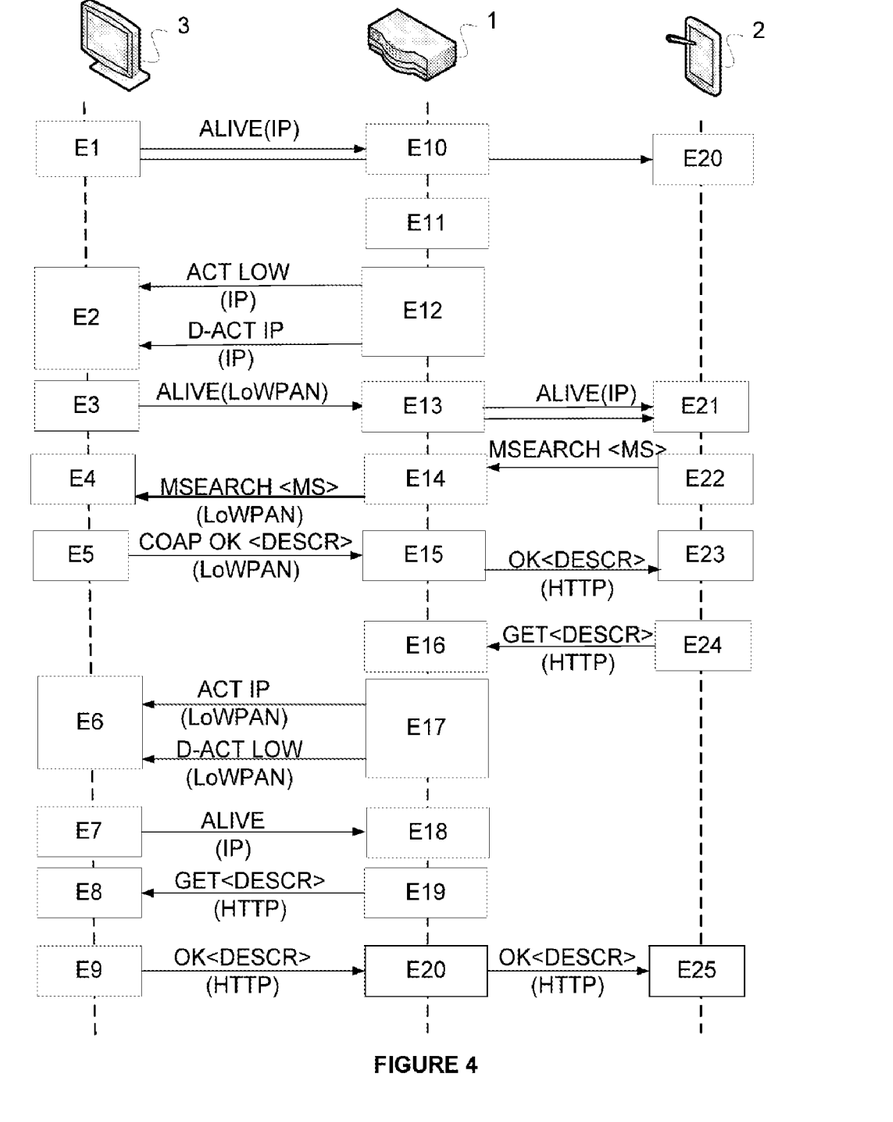
FIG. 4 shows a timing diagram for the exchanges between the various equipment items of the local area network when the invention is implemented.

FIG. 4 shows the exchanges between a control point (CP) of UPnP type that is installed, in this example, on a tablet (2) in the local area network, a device for managing the communication by controlling the interfaces according to the invention (PIL), which is installed on the gateway (1), and a terminal equipment item (3) that is equipped with a communication device and with a Media Server, for example the Media Server in FIG. 1.

The terminal equipment item (3) is accessible on the local area network via its address (typically a URL, from the English Uniform Resource Locator, having an Internet address (IP) and port number combination) via the home gateway. The terminal equipment item and the gateway each have two types of interface that are called main (IPv6) and secondary (LoWPAN, Zigbee), allowing conversation on two types of links.

In a step E1, the terminal equipment item (3) uses the local area network to send, in multicast mode, an announcement of UPnP "ALIVE" type to show that it is present and active. The broadcast message is shown schematically in FIG. 3, as are all the subsequent messages, by the message type (ALIVE) followed by the parameters of the message between separators < > and the type of interface used between parentheses Q. Thus, "ALIVE(IP)" means that the terminal equipment item transmits its address via its IP interface, in the IP format, that is to say by complying with the syntax of the IPv6 data packets according to this example.

The complete syntax of such a UPnP message could be in the form:

SSDP NOTIFY ssdp: alive TERMINAL_ADDRESS

The ALIVE message is received, in the example, by the module PIL according to the invention on the home gateway (1) in the course of a step E10 and by the control point on the tablet (2) in a step E20.

In a step E11, the control module PIL of the invention detects a low level of activity on the IP link. This step may particularly be undertaken by a background task of the module PIL that computes, continuously or periodically, the number of packets exchanged on the IP network, or the percentage of bandwidth occupied. If the activity on the link is considered to be at a low level, the module PIL according to the invention can take the decision to temporarily deactivate the IP link of the terminal equipment item (3), which consumes more energy than the LoWPAN link, in order to save energy.

In such a case, in a step E12, the control module PIL sends the terminal equipment item 3 a command for activating a low consumption network, symbolized by the command ACT_LOW in FIG. 3. This command is received in a step E2 by the terminal equipment item (3), which activates the low consumption interface, in our example Zigbee/LoW-PAN. In one and the same step E11, the module PIL according to the invention deactivates the IP link via a deactivation command symbolized by the message "D-ACT IP". The terminal equipment item deactivates its IPv6 interface and will therefore now transmit its messages via the Zigbee/LoWPAN interface.

In a step E3, the terminal equipment item (3) uses the LoWPAN network to send an announcement of UPnP ALIVE type to show that it is present and active, denoted ALIVE(LoWPAN), showing that the terminal equipment item transmits its address via its LoWPAN interface (in our example Zigbee) in the format of the LoWPAN network. This message is of Unicast type, that is to say that it is addressed only to the gateway (1).

The gateway (1) retransmits the message in the course of a step E13 on the IP network to the control point.

In a variant that is not shown, the terminal equipment item (3) can translate its "SSDP ALIVE" message into the format of the aforementioned COAP standard, on the service layer (see FIG. 2). Such a format (COAP) allows the message to be broadcast in multicast mode, that is to say to multiple equipment items. In this case, however, the gateway (1) needs to reconvert the message to the SSDP format before transmitting it to the control point and to the other equipment items of the network if necessary.

In the step E14 that follows it, the control module PIL receives what is known as a search request message (MSEARCH) from the control point (CP) of the terminal equipment item (2) that is requested, by way of example, by a user wishing to show a film situated on the terminal equipment item (3), and therefore sends a search request (MSEARCH<TARGET>) in order to look for all the UPnP terminals of the local area network of the type that corresponds to the target, that is to say in the example all the terminals of Media Server type (MS, for short). In the UPnP syntax, this message is in the UPnP form: SSDP MSEARCH target.

The control module PIL receives and analyzes this message in the course of step E14, after which it transfers the message to the terminal equipment item (3) in the 6LoWPAN format, to its Zigbee interface (MSEARCH<MS> (LOWPAN) message).

The response from the terminal equipment item (3), from step E5, is, according to this example, compliant with the COAP protocol introduced previously with reference to FIG. 2 and can take the following syntax, for example:

COAP 200 OK "URL 6LoWPAN from the XML description file"

The control module PIL of the invention then transfers the message to the control point of the terminal equipment item (2), in a "standard" syntax of the IP network, that is to say an HTTP message (OK<DESCR>).

The control point CP, if its interest is aroused by the search target in step E23, then reacts in the course of a step E24 by sending the gateway an HTTP message of GET<DESCR> type in order to retrieve more information about the search target.

In a step E17, the control module PIL detects that the control point CP wishes to access the terminal equipment item and decides to activate the IP interface (IPv6) of the terminal (ACT IP). Following this message, it is indeed foreseeable that the traffic will become significant, since multimedia data will be interchanged between the equipment items. The module PIL may, following this activation, deactivate the interface of the LoWPAN network (D-ACT LOW).

When it subsequently (E18) receives an ALIVE message from the IP interface of the terminal equipment item, the module PIL can retransmit the HTTP GET message from the control point, in the course of a step E19 (HTTP GET<DESCR>), after having translated the address that the initial request contains. The reason is that there are, at this instant, two IPv6 addresses for the message, corresponding to the two main and secondary interfaces: the address of the 6LoWPAN interface and the IPv6 address of the IP interface.

Finally, conventionally, the gateway transmits the response from the terminal equipment item (3) to the control point, in a step E20, and the process of consumption of the content of the terminal equipment item (3), for example with the aim of display, can then begin in entirely conventional fashion.

According to a variant, following step E16, the control module PIL can choose to leave the main IPv4/IPv6 interface of the terminal equipment item deactivated. In this case, the HTTP GET request from the control point will be transmitted to the terminal in the format "COAP GET". The response from the terminal "COAP OK" will be transmitted to the control point in the form "HTTP OK".

The control module PIL can decide to wake up the main interface depending on multiple criteria, among which the following may be cited:

reception of a request from the control point that will give rise to a large data transfer. By way of example, the request received by the module PIL may be of UPnP BROWSE type. Reception of such a request indicates the imminent transfer of an item of multimedia content between the Media Server (3) and the gateway (1).

absence of a response ("timeout") or reception of an error from the terminal equipment item, which could show that the equipment item is not managing to transmit its response on the 6LoWPAN network.

bandwidth of the 6LoWPAN link is used to a certain percentage, for example 75% or more.

excessive latency between the sending of the request and the response (for example 3 seconds).

It goes without saying that the embodiment that has been described above has been provided purely by way of indication and without in any way implying limitation, and that numerous modifications can easily be made by a person skilled in the art without, however, departing from the framework of the invention.

The invention claimed is:

1. A method comprising:
managing communication on a local network between a first equipment item, which is a home gateway, and a second equipment item, said first and second equipment items being capable of communicating a data stream via a first communication link, called a main link, and capable of communicating the data stream via a second communication link, called a secondary link, wherein energy consumption of the second communication link is lower than that of the first communication link, and wherein managing comprises the following acts performed by the first equipment item on the network:
evaluating use of bandwidth on at least one of the main or secondary link;
establishing validity of a criterion by comparing said use of bandwidth with a threshold on at least one of the main or secondary link;
depending on the validity of the criterion, activating the main or secondary link and deactivating the other link for transmission of said data stream;
receiving a request for the data stream from a third equipment item of the local network; and
transmitting the data stream on the activated one of the main link or the secondary link.

2. The method for managing the communication as claimed in claim 1, comprising activating the secondary link of the terminal and deactivating the main link of the terminal if the criterion is valid.

3. The method for managing the communication as claimed in claim 1, comprising activating the main link of the terminal if the criterion is not valid.

4. The method for managing the communication as claimed in claim 1, wherein activating the secondary link is followed by:

a. the first equipment item sending a message on the secondary link to the second equipment item;
b. the first equipment item receiving a message from the second equipment item on the secondary link;
c. the first equipment item formatting and retransmitting the message received from the second equipment item to at least one other equipment item of the network.

5. A method comprising:
communicating on a second terminal equipment item, said second equipment item being capable of communicating a data stream with a first equipment item, which is a home gateway, on a local network via a first communication link, called a main link, and capable of communicating the data stream via a second communication link, called a secondary link, wherein energy consumption of the second communication link is lower than that of the first communication link, and wherein communicating comprises the following acts performed by the second equipment item:
receiving at least one command message from the first equipment item to activate the secondary link and deactivate the main link, said at least one command message being based on a comparison of a use of bandwidth on at least one of the main or secondary link with a threshold;
in response to the at least one command message, activating the secondary link and deactivate the main link;
receiving a request of a third equipment item of the local network for the data stream;
formatting at least one message containing the data stream for the secondary link; and
sending said at least one formatted message on the secondary link.

6. An apparatus comprising:
a device configured to manage communication on a local network between two equipment items, a first equipment item, which is a home gateway, and a second equipment item, said equipment items being capable of communicating a data stream via a first communication link, called a main link, and capable of communicating the data stream via a second communication link, called a secondary link, wherein energy consumption of the second communication link is lower than that of the first communication link, and wherein the device is associated with the first equipment item and comprises:
a processor; and
a non-transitory computer-readable medium comprising code instructions stored thereon, which when executed by the processor configure the device to perform acts comprising:
evaluating use of bandwidth on at least one of the main or secondary link;
establishing validity of a criterion by comparing said use of bandwidth with a threshold on at least one of the main or secondary link;
activating the main or secondary link and deactivating the other link for transmitting said data stream depending on the validity of the criterion;
receiving a request for the data stream from a third equipment item of the local network; and
transmitting the data stream on the activated one of the main link or the secondary link.

7. The apparatus according to claim 6, wherein the apparatus constitutes a home gateway comprising the device.

8. An apparatus comprising:
a device configured to communicate on a second; terminal equipment item, said second terminal equipment item being capable of communicating a data stream with a first equipment item, which is a home gateway, on a local network via a first communication link, called a main link, and capable of communicating the data stream via a second communication link, called a secondary link, wherein energy consumption of the second communication link is lower than that of the first communication link, wherein the device comprises:
a processor; and
a non-transitory computer-readable medium comprising code instructions stored thereon, which when executed by the processor configure the device to perform acts comprising:
receiving at least one command message from the first equipment item to activate the secondary link and deactivate the main link, said at least one command message being based on a comparison of a use of bandwidth on at least one of the main or secondary link with a threshold;
in response to the at least one command message, activating the secondary link and deactivate the main link;
receiving a request of a third equipment item of the local network for the data stream;
formatting at least one message containing the data stream for the secondary link; and
sending said at least one formatted message on the secondary link.

9. The apparatus of claim 8, wherein the apparatus constitutes the terminal equipment item, which comprises the device.

10. A non-transitory computer-readable recording medium comprising a computer program stored thereon and capable of being implemented on a first equipment item, which is a home gateway, the program comprising code instructions that, when the program is executed by a processor of the home gateway, configures the home gateway to perform acts of:
managing communication on a local network between the first equipment item and a second equipment item, said first and second equipment items being capable of communicating a data stream via a first communication link, called a main link, and capable of communicating the data stream via a second communication link, called a secondary link, wherein energy consumption of the second communication link is lower than that of the first communication link, and wherein managing comprises:
evaluating use of bandwidth on at least one of the main or secondary link;
establishing validity of a criterion by comparing said use of bandwidth with a threshold on at least one of the main or secondary link;
depending on the validity of the criterion, activating the main or secondary link and deactivating the other link for transmitting said data stream;
receiving a request for the data stream from a third equipment item of the local network; and
transmitting the data stream on the activated one of the main link or the secondary link.

11. A non-transitory computer-readable recording medium comprising a computer program stored thereon and capable of being implemented on a second terminal equipment item, the program comprising code instructions that, when the program is executed by a processor of the second terminal equipment item, configures the second terminal equipment item to perform acts of:
- communicating on the second terminal equipment item, said second terminal equipment item being capable of communicating a data stream with a first equipment item, which is a home network, on a local network via a first communication link, called a main link, and capable of communicating the data stream via a second communication link, called a secondary link, wherein energy consumption of the second communication link is lower than that of the first communication link, wherein communicating comprises:
- receiving at least one command message from the first equipment item to activate the secondary link and deactivate the main link, said at least one command message being based on a comparison of a use of bandwidth on at least one of the main or secondary link with a threshold;
- in response to the at least one command message, activating the secondary link and deactivate the main link;
- receiving a request of a third equipment item of the local network for the data stream;
- formatting at least one message containing the data stream for the secondary link; and
- sending said at least one formatted message on the secondary link.

* * * * *